US007509143B2

(12) United States Patent
Lintern et al.

(10) Patent No.: US 7,509,143 B2
(45) Date of Patent: Mar. 24, 2009

(54) TELECOMMUNICATIONS CARD WITH INTEGRATED ANTENNA

(75) Inventors: Richard Lintern, Cambridge (GB); Charles Dillon, Bottisham (GB); Nick Ward, Ely (GB)

(73) Assignee: Option, Leuven (BE)

( * ) Notice: Subject to any disclaimer, the term of this patent is extended or adjusted under 35 U.S.C. 154(b) by 1006 days.

(21) Appl. No.: 09/907,502

(22) Filed: Jul. 18, 2001

(65) Prior Publication Data

US 2002/0022460 A1 Feb. 21, 2002

(30) Foreign Application Priority Data

Jul. 18, 2000 (EP) ................................. 00870166

(51) Int. Cl.
*H04B 1/38* (2006.01)
*H04M 1/00* (2006.01)

(52) U.S. Cl. ........................ 455/558; 455/74; 455/90.3; 455/97; 455/128; 455/129; 455/348; 455/349; 455/556.1; 455/556.2; 455/557; 343/702; 343/757; 343/872

(58) Field of Classification Search ................... 455/74, 455/90.3, 97, 128, 129, 348, 351, 556.1, 455/556.2, 557, 558; 343/700, 702, 757, 343/872
See application file for complete search history.

(56) References Cited

U.S. PATENT DOCUMENTS 3,981,016 A * 9/1976 Iwata et al. ................. 342/427
4,263,539 A * 4/1981 Barton ....................... 318/664
4,920,352 A * 4/1990 Martensson et al. ......... 343/702
5,061,936 A * 10/1991 Suzuki ....................... 342/359
5,138,329 A * 8/1992 Saarnimo et al. ............ 343/702
5,376,941 A * 12/1994 Fukazawa et al. ........... 342/359
5,497,506 A * 3/1996 Takeyasu ................. 455/575.8
5,557,288 A * 9/1996 Kato et al. .................. 343/702
5,646,635 A * 7/1997 Cockson et al. ............. 343/702
5,784,595 A * 7/1998 Devins et al. ................. 703/24
5,821,903 A * 10/1998 Williams .................... 343/702
5,835,596 A * 11/1998 Klemba et al. .............. 713/172
5,913,174 A * 6/1999 Casarez et al. .............. 455/557
5,949,379 A * 9/1999 Yang .......................... 343/702
6,073,027 A * 6/2000 Norman et al. .......... 455/575.4
6,172,645 B1 * 1/2001 Hollander et al. ........... 343/702
6,191,741 B1 * 2/2001 Gauld et al. ................ 343/702
6,259,418 B1 * 7/2001 Jones et al. ................. 343/846
6,266,017 B1 * 7/2001 Aldous ....................... 343/702
6,292,146 B1 * 9/2001 Melax ........................ 343/702

(Continued)

FOREIGN PATENT DOCUMENTS

EP 0 936 694 8/1999

*Primary Examiner*—Stephen M D'Agosta
(74) *Attorney, Agent, or Firm*—Browdy and Neimark, P.L.L.C.

(57) ABSTRACT

A telecommunications card which includes a cavity in which an antenna structure is movably mounted between a first position in which the antenna structure is substantially located within the cavity and a second position in which the antenna structure is extended from the cavity, the telecommunications card further including moving mechanism for moving the antenna structure from the first position to the second position, the antenna structure comprising a slide portion and an antenna portion which are movably connected to each other, wherein the antenna structure further including an erecting mechanism for erecting the antenna portion from the second position to a third position suitable for wireless communication with a telecommunications network.

17 Claims, 6 Drawing Sheets

U.S. PATENT DOCUMENTS 6,292,148 B1 * 9/2001 Matsuura et al. ............ 343/702
6,359,591 B1 * 3/2002 Mou .......................... 343/702
6,522,299 B2 * 2/2003 Beard et al. ................. 343/702

* cited by examiner

TELECOMMUNICATIONS CARD WITH INTEGRATED ANTENNA

FIELD OF THE INVENTION

The present invention relates to a telecommunications card with an integrated antenna according to the preamble of the first claim.

BACKGROUND OF THE INVENTION

The use of telecommunications cards for providing wireless communication between a host device and a telecommunication network is well known in the art. Such a telecommunications card is a separate device which is provided to be inserted in a slot provided in a host device, such as for example a laptop personal computer or any other device. In order to obtain an electrical contact between the components of the telecommunications card and those of the host device, the telecommunications card is provided with an interface, such as a 68-pin connector or any other, which is connectable to a socket or adapter in the slot of the host device.

Such a telecommunications card is for example known from EP-A-936.694. This document describes a telecommunications card with an interior cavity in which an antenna structure is slidably mounted. The antenna structure is slidable between a first position in which the antenna structure is substantially located within the cavity and a second position in which the antenna structure is extended from the cavity. The telecommunications card also comprises moving means for moving the antenna structure from the first position to the second position and back. These moving means comprise (1) a compression spring which is provided to urge the antenna structure from the first position to the second position and a retraction spring which is provided to urge the antenna structure from the second position to the first position, (2) a single compression/retraction spring which is provided to move the antenna structure between the two positions, or (3) a micromotor which is provided to move the antenna structure between the two positions. The antenna structure comprises a slide portion and an antenna portion which are connected by means of a ball joint. In the second position, the antenna portion is rotatable and pivotable in relation to the slide portion by means of the ball joint. In this way the antenna portion can be orientated in a position suitable for wireless communication with a telecommunications network.

However, the telecommunications card described in EP-A-936.694 has the disadvantage that the user has to search for a suitable position of the antenna portion by manually orientating the antenna portion. As a result, it may occur that the antenna portion is in a position in which the wireless communication with a telecommunications network is not optimal. This may lead to problems in ensuring a good wireless communication between the telecommunications card and the network.

SUMMARY OF THE INVENTION

It is therefore an aim of the present invention to provide a telecommunications card with which wireless communication can be improved.

This aim is achieved according to the invention by means of a telecommunications card having the technical characteristics set forth herein.

The telecommunications card according to the invention comprises a cavity in which an antenna structure is movably mounted between a first position in which the antenna structure is substantially located within the cavity and a second position in which the antenna structure is extended from the cavity. The telecommunications card further comprises moving means for moving the antenna structure from the first position to the second position. The antenna structure comprises a slide portion and an antenna portion which are movably connected to each other. The antenna structure further comprises erecting means for erecting the antenna portion to a third position suitable for wireless communication with a telecommunications network. By providing the erecting means, orientating the antenna portion in a suitable position can be carried out by the erecting means, without necessitating manual intervention of the user. In this way a nearly optimal position of the antenna portion can be achieved automatically in all circumstances which will generally result in a major improvement of the wireless communication between the card and the network. On the contrary, a manual adjustment could enable an experienced user to achieve an even better position in a few rare cases, but the improvement he can achieve will be small and in general a manual adjustment technique will result in a much poorer performance than the novel automatic technique. Furthermore, the erecting means maintain the antenna in a suitable position for wireless communication, whereas in the prior art the suitable position of the antenna can be disturbed by the user. Also, by providing the erecting means, it can be obtained that the antenna portion remains in an optimal position when the host device is located on a means of transportation, which can for example occur when the user is working on a laptop PC on a moving train. With the prior art telecommunications card, it may often occur that the antenna would have to be manually reorientated by the user as the radiation pattern of the network varies geographically, which might result in a loss of the wireless connection.

In the third position, the antenna portion is preferably erected such that the angle between the plane formed by the antenna portion and the plane of the telecommunications card is larger than 30° but smaller than 90°, the optimum angle being about 60°. By selecting an angle >30°, a major improvement of the sensitivity is obtained compared to a position in which the plane of the antenna portion is substantially parallel to the plane of the telecommunications card. By making the angle <90°, a free space is obtained between the antenna portion and the side of the host device in which the telecommunications card is located. This free space can prevent the interference that occurs between electrical components in the antenna portion and electrical components in the host device, Furthermore, in case the host device is a laptop PC, the free space can provide room for the hands of the user of the laptop PC during typing. Thus, providing the free space can further enhance the wireless communication between the telecommunications card and the network.

In a preferred embodiment of the telecommunications card of the invention, the antenna portion is removably mounted on the slide portion. The removability of the antenna portion has number of advantages. A first advantage is that the manufacturing of the telecommunications card can be simplified, as the erectable antenna portion can be mounted after the assembly of the telecommunications card itself. A second advantage is that, after manufacturing the telecommunications card, it can be customised by selecting and mounting an antenna portion which is most suited to the needs of the user. The removability of the antenna portion also makes it possible to simply mount a new antenna portion when the original has been damaged.

The telecommunications card of the invention preferably further comprises a coaxial connector for connecting a coaxial cable to the telecommunications card. This coaxial connector is preferably located on the same side as the antenna structure, so that it is accessible when the telecommunications card is located in the slot of the host device. By providing the coaxial connector, the telecommunications card can be connected via a coaxial cable to any equipment known to the person skilled in the art, which equipment is provided to communicate with the telecommunications card. This equipment can for example be a further antenna, which can be used in case the antenna provided in the telecommunications card shows a malfunction or when a higher-gain antenna is needed than the antenna provided in the telecommunications card. The coaxial connector also provides an access for any type of measurement apparatus, by means of which any characteristic of any component of the telecommunications card can be measured. The measurement apparatus can for example serve to locate any malfunction of a component in the card, or to regulate any component in the card, or to any other purpose.

The telecommunications card of the invention is preferably provided with switching means for alternatively selecting between the antenna and the coaxial connector. The switching means may be an electronic switch, for example a transistor switch, or a mechanical switch, or any other switch known to the person skilled in the art. Providing such switching means has the advantage that a selection can be made between wireless communication using the antenna integrated in the card and communication using the coaxial connector.

In a preferred embodiment, the switching means are constructed such that they select the coaxial connector when a coaxial cable is inserted and the internal antenna otherwise. In this more preferred embodiment, the coaxial connector is preferably a coaxial connector with the switching means incorporated, so that no separate switching means have to be provided in the interior of the telecommunications card, with the advantages of saving space and limiting the number of assembly steps for manufacturing the card. This also has the advantage that a coaxial connector with incorporated cable detection, which is known in the art, can be used as switching means for selecting between the internal and external antennas.

In a different embodiment, these switching means are operated by detecting means for detecting whether the antenna portion is in the first position or the third position. These detecting means can for example comprise first and second contact pads which are provided to contact each other when the antenna structure is in the third position and are spaced apart when the antenna structure is in the first position, a current source for providing an electrical current to the contact pads and a feedback conductor connecting the contact pads to the switching means. When the antenna structure is in the third position, the contact pads conduct the electrical current from the current source to the switching means. Otherwise, when the antenna structure is in the first position, the contact pads form an obstruction for the electrical current.

The detecting means can for example also comprise a magnet located on the antenna portion and a hall effect device located in the interior of the communications card. In this way, the position of the antenna portion is magnetically detected. Accordingly, the internal antenna is selected when the antenna portion is detected in the third position and the coaxial connector is selected otherwise.

The detecting means can also be any other detecting means known to the person skilled in the art. Providing the detecting means has the advantage that the switching means know which position the antenna structure is in and accordingly select the antenna when it is in the third position and the coaxial connector when the antenna structure is in the first position.

The telecommunications card of the invention preferably further comprises an audio connector for connecting a headset comprising a microphone and a speaker, or any other audio device, to the telecommunications card. This audio connector is preferably a stereo jack, but may also be any other audio connector known to the person skilled in the art. Providing the audio connector has the advantage that a user can use the telecommunications card in a way similar to a wireless telephone, for talking to other persons.

The telecommunications card of the invention preferably has a housing with a top layer, an intermediate layer and a bottom layer, the intermediate layer being provided to include the components of the card. The top layer and the bottom layer are preferably constructed in sheet metal and preferably include supporting frames for the intermediate layer which are moulded to the top and bottom metal. The supporting frame may also be a separate moulding located in the intermediate layer. The top and bottom layer may also be constructed in any other material known to the person skilled in the art. The supporting frame is preferably constructed in a plastic material, but may also be constructed in any other material known to the person skilled in the art. The intermediate layer comprises a printed circuit board for including the electronic components of the card, the antenna structure, the printed circuit board and any other components of the card.

The telecommunications card according to the invention is preferably provided with a slot for inserting a SIM-card. Such SIM-cards are small cards which have information concerning the user stored on them. This information is accessible through contact pads provided on a surface of the SIM-card. In the telecommunications card of the invention, the slot is preferably provided in the supporting frame moulded on the top layer with direct access through the top layer. The SIM-card is preferably insertable into the slot through an insertion opening in a side of the telecommunications card. To facilitate the insertion and removal of the SIM-card, the top layer can be coated on the inside with a smooth material. The slot preferably has edge guides for guiding opposite edges of the SIM-card during insertion, which edge guides are preferably formed in the supporting frame. A SIM-card connector is preferably mounted on the printed circuit board in such a way that it forms part of the bottom side of the slot, the connector being provided to contact the contact pads on the SIM-card when the SIM-card is located inside the slot. As the edge guides for guiding the opposite edges of the SIM-card during insertion or removal are provided on the supporting frame and the SIM-card connector forms part of the bottom side of the slot, the use of a separate SIM-card holder with edge guides and a connector can be avoided. In this way, a certain amount of internal space of the telecommunications card can be saved, as no holding means for holding a separate SIM-card holder in position have to be provided in the card. This saving of space provides part of the space necessary for integrating the antenna structure in the telecommunications card.

To ensure that the SIM-card is correctly slid over the SIM-card connector, a ramp can be provided on the supporting frame at the entrance of the slot. Furthermore, an end stop can be provided on the supporting frame for fixing the SIM-card in its correct position.

The top layer is preferably provided with a second opening on an end of the slot opposite the insertion opening. This second opening allows a user to easily remove the SIM-card from the slot by pushing the SIM-card towards the insertion opening by means of a finger or a tool. However, this second opening is designed such that the user cannot touch the contact pads of the SIM-card connector, so that damage of the SIM-card connector can be avoided.

The telecommunications card of the invention is preferably provided with locking means for locking the antenna structure in the first position, while it is not in use. The locking means are preferably constructed such that a user can unlock the antenna structure by pressing an edge of the antenna structure which is accessible from outside the telecommunications card, upon which the antenna structure is moved to the second position by the moving means provided on the telecommunications card, after which the antenna portion is erected to the third position by the erecting means provided on the antenna structure.

BRIEF DESCRIPTION OF THE DRAWINGS

The invention will be further elucidated by means of the following description and the appended figures.

DETAILED DESCRIPTION OF THE INVENTION

Figure 1A:
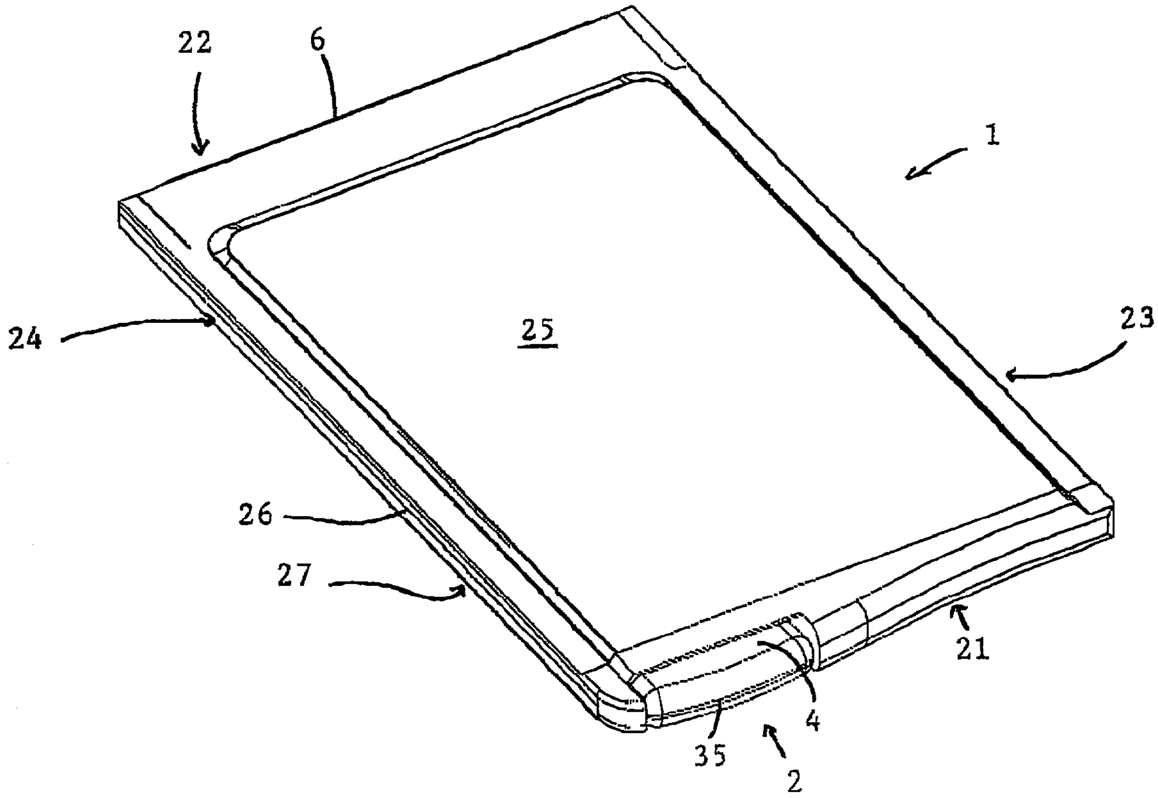
FIGS. 1 *a-c* show a first embodiment of the telecommunications card according to the invention, with the antenna structure respectively in the first position inside the cavity, in the second position extended from the cavity and in the third position erected for wireless communication.
Figure 1B:
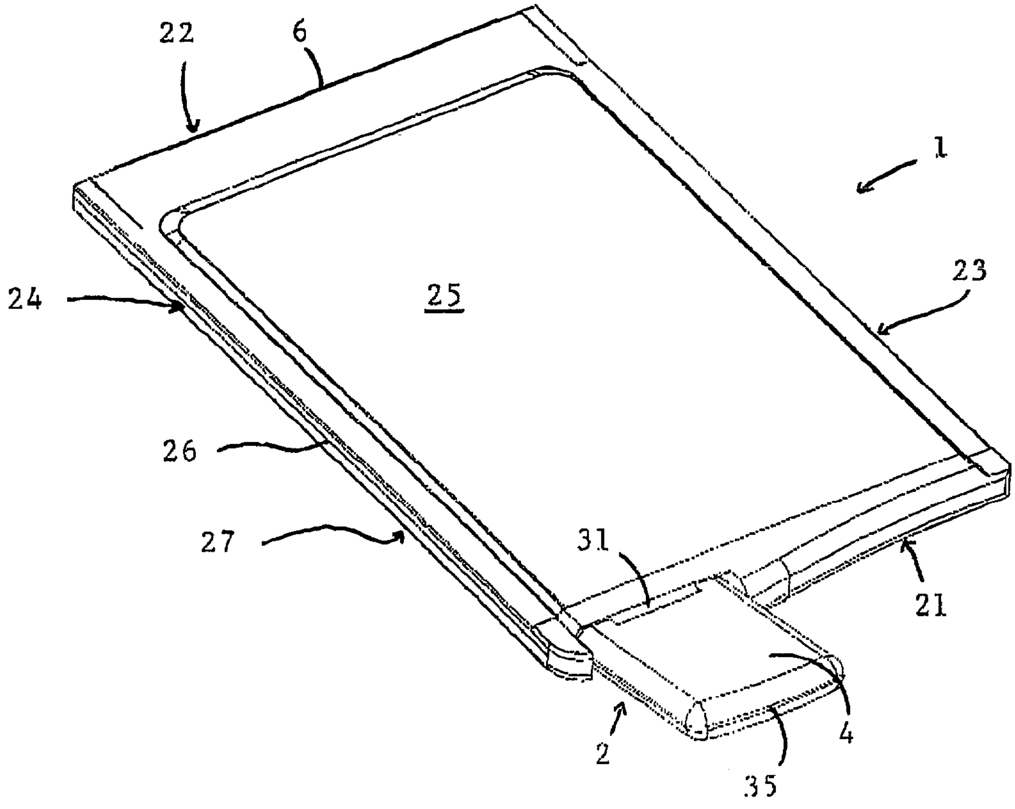
Figure 1C:
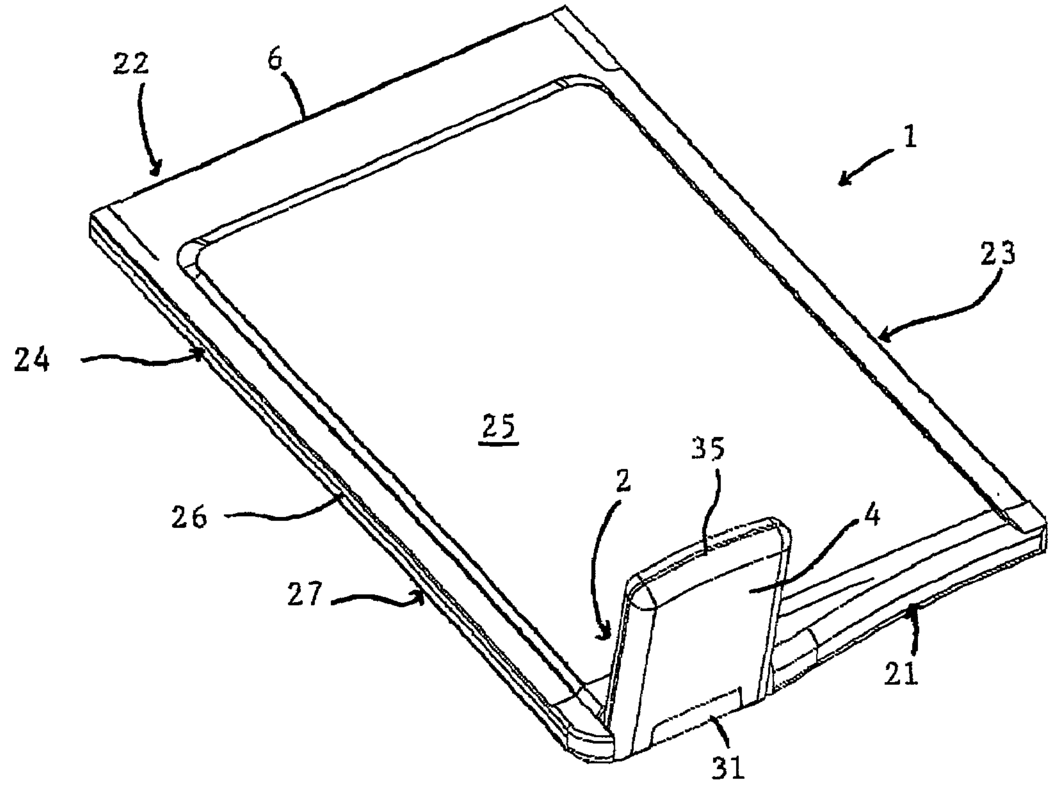

The telecommunications card 1 shown in FIGS. 1 *a-c* comprises an antenna structure 2 which is movably mounted in a cavity 3. The antenna structure 2 can be moved between a first position in which it is substantially located within the cavity (FIG. 1*a*), and a second position in which the antenna structure is extended from the cavity (FIG. 1*b*). Moving means are provided in the telecommunications card 1 for moving the antenna structure 2 from the first to the second position. The antenna structure 2 comprises a slide portion 5 and an antenna portion 4, which are movably connected to each other. The antenna structure further comprises erecting means for erecting the antenna portion 4 to a third position suitable for wireless communication (FIG. 1*c*). In the third position, the antenna portion is preferably erected such that the angle between the plane formed by the antenna portion and the plane of the telecommunications card is larger than 30° but smaller than 90°, the optimum angle being about 60°.

The moving means for moving the antenna structure 2 from the first to the second position preferably comprise a compression spring 32, but may also comprise any other moving means known to the person skilled in the art, such as for example a micromotor or any other.

The erecting means of the antenna structure 2 preferably comprise a torsion spring 39, but may also comprise a rotating cam action or any other kind of erecting means known to the person skilled in the art.

Figure 2:
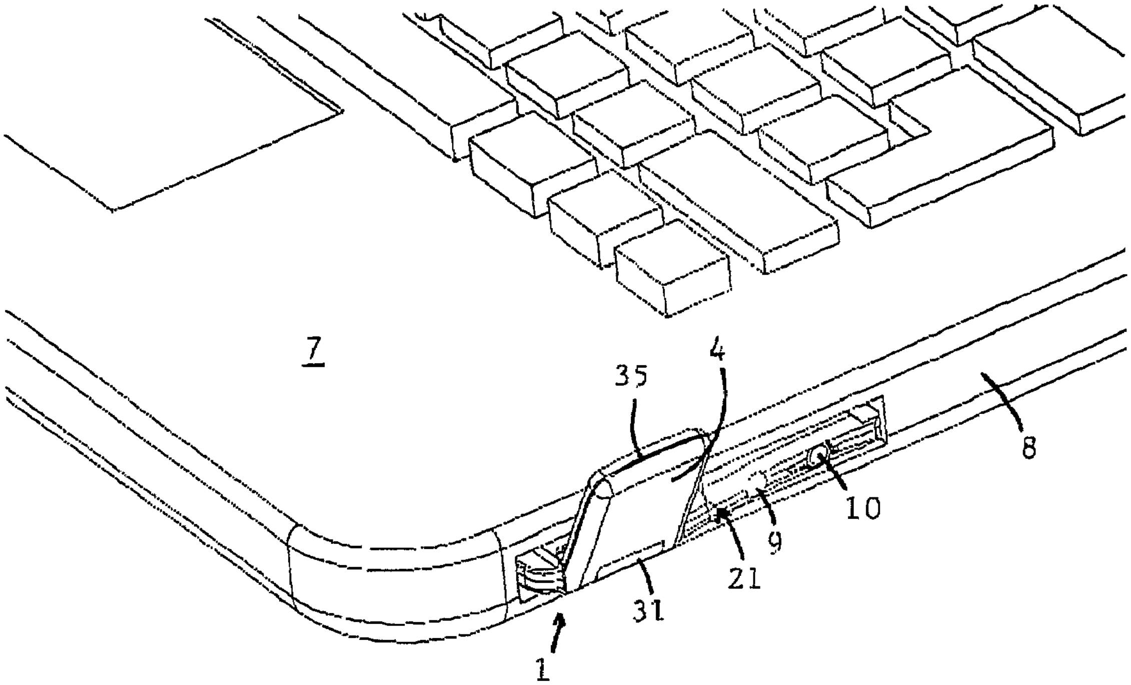
FIG. 2 shows a second embodiment of the telecommunications card according to the invention located in a slot of a laptop PC, the card comprising a coaxial connector and an audio connector.

FIG. 2 shows a telecommunications card 1 according to the invention located in a slot of a laptop PC 7 with the antenna portion 4 in the third position suitable for wireless communication. The slot is provided in a side 8 of the laptop PC 7. As the angle between the plane formed by the antenna portion 4 and the plane of the telecommunications card 1 is between 30° and 90°, preferably 60°, a free space is present between the antenna portion 4 and the side 8 of the laptop PC 7. This free space can prevent the interference that occurs between electrical components in the antenna portion 4 and electrical components in the laptop PC 7. Furthermore, the free space can provide room for the hands of the user of the laptop PC during typing. Erecting the antenna portion 4 to an angle larger than 30° but smaller than 90°, the optimum angle being about 60°, provides a nearly optimal position for ensuring a good wireless communication in all conditions.

The antenna portion 4 preferably contains a flexible printed radiating structure (not shown). Furthermore, a printed fractal shape is preferred to minimise the antenna size and optimise its radiation pattern. However, the antenna portion may also have any other kind of radiating structure known to the person skilled in the art.

The telecommunications card 1 preferably has a substantially rectangular shape with a front side 21, a back side 22 and two lateral sides 23, 24. The telecommunications card is preferably composed as a laminate of a top layer 25, an intermediate layer 26 and a bottom layer 27. The top and bottom layers are preferably made from sheet metal, but may also be made from any other material deemed suitable by the person skilled in the art. The intermediate layer preferably comprises a printed circuit board 28 for mounting the electronic and other components of the card 1. The card 1 is further provided with a supporting frame 29 for supporting the printed circuit board 28, the antenna structure 2 and any other components of the card 1. This supporting frame 29 may be a separately moulded part of the intermediate layer 26, or may be constructed in two parts which are moulded onto the sheet metal of the top and bottom layers 25, 27.

The antenna structure 2 is preferably located on the front side 21 of the card 1. In this way it is accessible when the telecommunications card 1 is located in a slot of a host device 7. For connecting the telecommunications card 1 to the host device 7, the telecommunications card 1 preferably comprises an interface 6, which is preferably located on the back side 22 of the card 1. This interface can be a standard 68-pin connector or any other interface known to the person skilled in the art.

In the embodiment shown in FIG. 2, the telecommunications card 1 comprises a coaxial connector 9 for connecting a coaxial cable (not shown) to the telecommunications card. This coaxial connector is preferably located on the front side 21, so that it is accessible when the telecommunications card 1 is located in the slot of the host device 7. By providing the coaxial connector 9, the telecommunications card 1 can be connected via a coaxial cable to any equipment known to the person skilled in the art, which equipment is provided to communicate with the telecommunications card 1. This equipment can for example be a further antenna, which can be used in case the antenna provided in the telecommunications card shows a malfunction or when a higher-gain antenna is needed than the antenna 2 provided in the telecommunications card. The coaxial connector 9 also provides an access for any type of measurement apparatus, by means of which any characteristic of any component of the telecommunications card can be measured. The measurement apparatus can for example serve to locate any malfunction of a component in the card, or to regulate any component in the card, or to any other purpose.

The telecommunications card 1 of FIG. 2 further comprises an audio connector 10 for connecting a headset (not shown) comprising a microphone and a speaker to the telecommunications card 1, or for connecting any other audio device to the telecommunications card. This audio connector 10 is preferably located on the front side 21, so that it is accessible when the telecommunications card 1 is located in the slot of the host device 7. The audio connector 10 is preferably a stereo jack, but may also be any other audio connector known to the person skilled in the art.

Figure 3A:
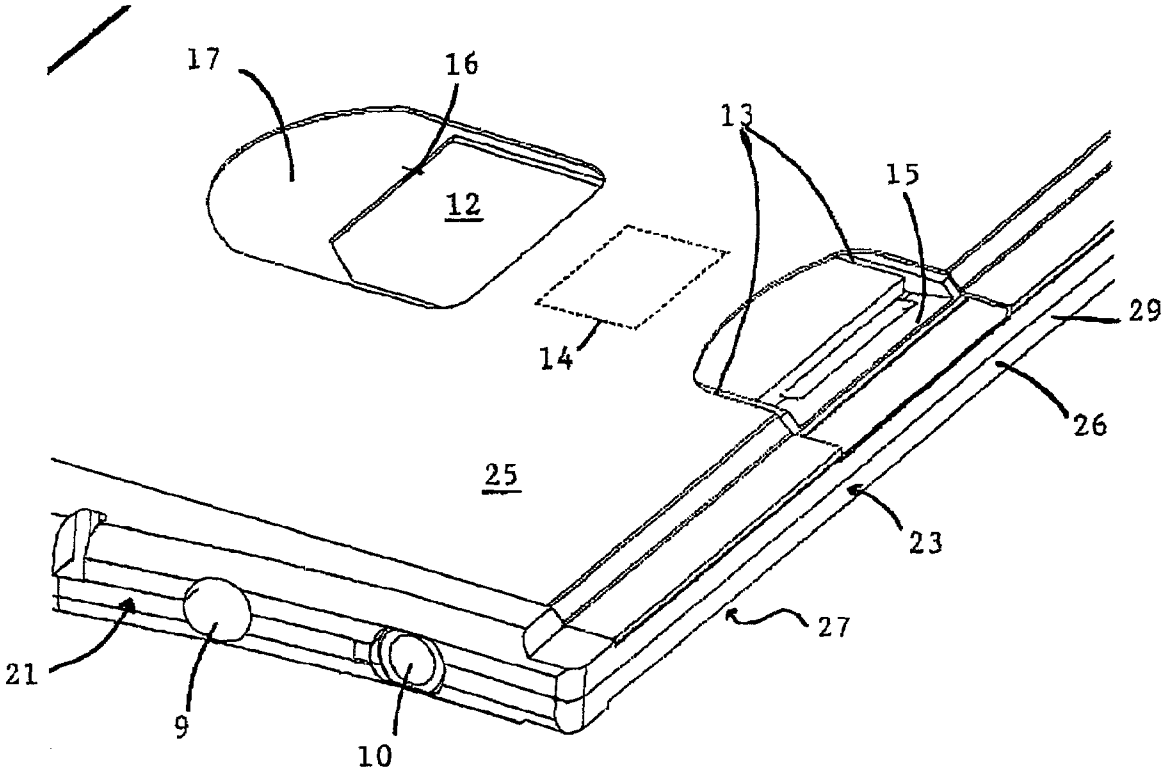
FIGS. 3 *a-b* show a third embodiment of the telecommunications card according to the invention further comprising a slot for receiving a SIM-card.

In the embodiment shown in FIGS. 3*a* and *b*, the telecommunications card 1 is provided with a slot 11 for inserting a SIM-card 12. The slot is preferably provided in the supporting frame 29 with direct access through the top layer 25. The SIM-card 12 is preferably insertable into the slot 11 through an insertion opening in one of the lateral sides 23, 24 of the telecommunications card 1. In this way, the SIM-card can only be inserted into or removed from the telecommunications card when the telecommunications card is outside the slot of the host device 7. Furthermore, the SIM-card is protected when the telecommunications card is located in the host device 7. In FIGS. 3*a* and *b*, the insertion opening is located on the right lateral side 23, which leaves space for incorporating the antenna structure 2 near the left lateral side 24. The insertion opening may however also be located on the left lateral side 24, the front side 21 or the back side 22. The slot 11 for inserting the SIM-card 12 may also be accessible through an insertion opening in the top layer 25 or the bottom layer 27.

To facilitate insertion and removal of the SIM-card 12, the top layer 25 above the slot 11 can be coated with a smooth material. The slot 11 preferably has edge guides 13 for guiding opposite edges of the SIM-card during insertion or removal. These edge guides 13 are preferably provided on the supporting frame 29. A SIM-card connector 14 is preferably mounted on the printed circuit board 28 in such a way that it forms part of the bottom side of the slot 11, the connector being provided to contact the contact pads on the SIM-card 12 when the SIM-card is located in the slot 11. As the edge guides 13 are provided on the supporting frame 29 and the SIM-card connector 14 forms part of the bottom side of the slot 11, the use of a separate SIM-card holder comprising edge guides 13 and connector 14 can be avoided. In this way, a certain amount of internal space of the telecommunications card 1 can be saved, as no holding means for holding the separate SIM-card holder in position have to be provided in the card. This saving of space provides part of the space necessary for integrating the antenna structure 2 in the telecommunications card 1.

To ensure that the SIM-card 12 is correctly slid over the SIM-card connector 14, a ramp 15 can be provided on the supporting frame 29 at the entrance of the slot 11. Furthermore, an end stop 16 can be provided on the supporting frame 29 for fixing the SIM-card in its correct position.

The top layer 21 is preferably provided with a second opening 17 on an end of the slot 11 opposite the insertion opening. This second opening 17 allows a user to easily remove the SIM-card 12 from the slot 11 by pushing the SIM-card towards the insertion opening by means of a finger or a tool. However, this second opening is designed such that the user cannot touch the contact pads of the SIM-card connector 14, so that damage of the SIM-card connector can be avoided.

Figure 4:
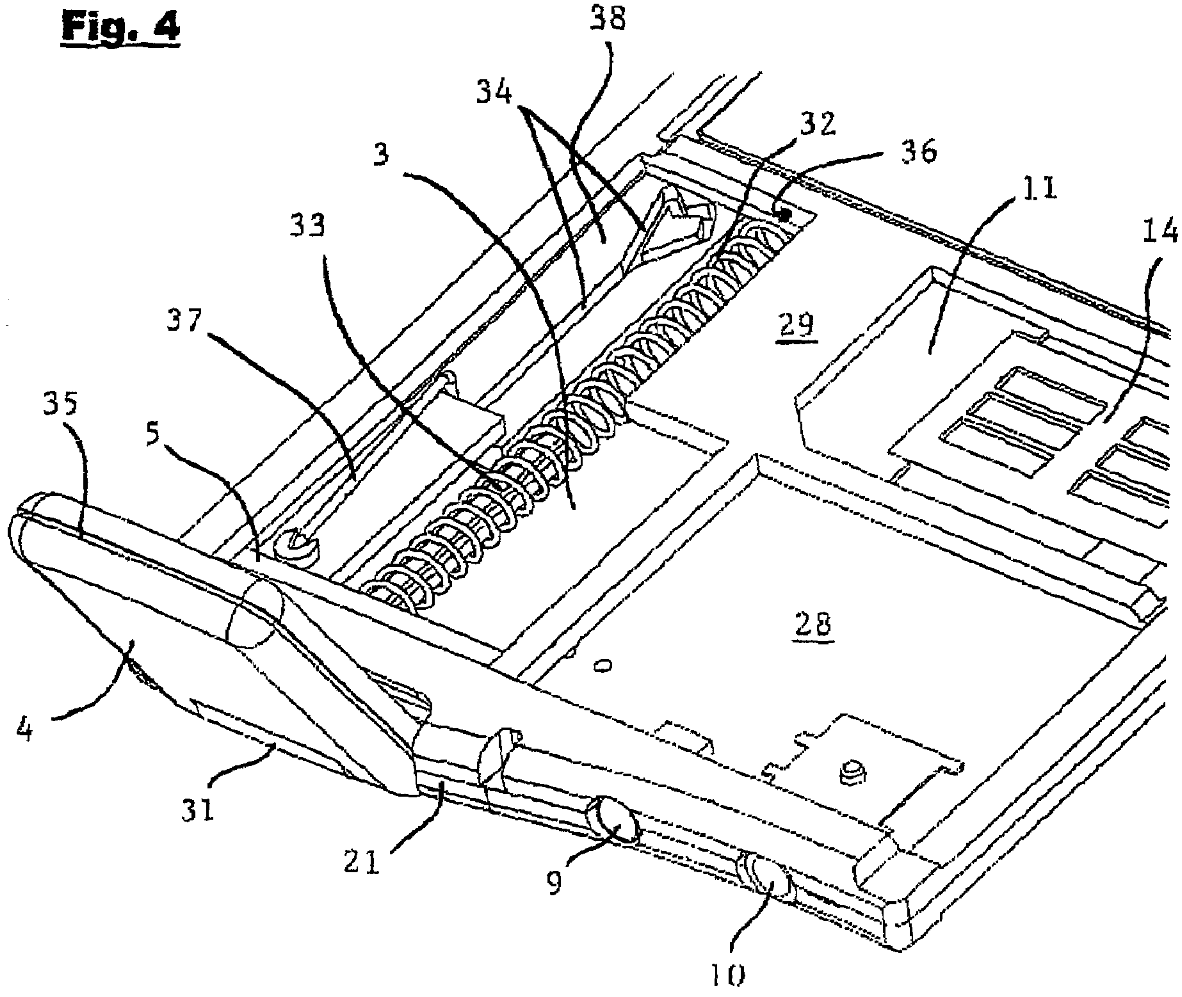
FIG. 4 shows a detail of the interior of the third embodiment of the telecommunications card according to the invention.
Figure 5:
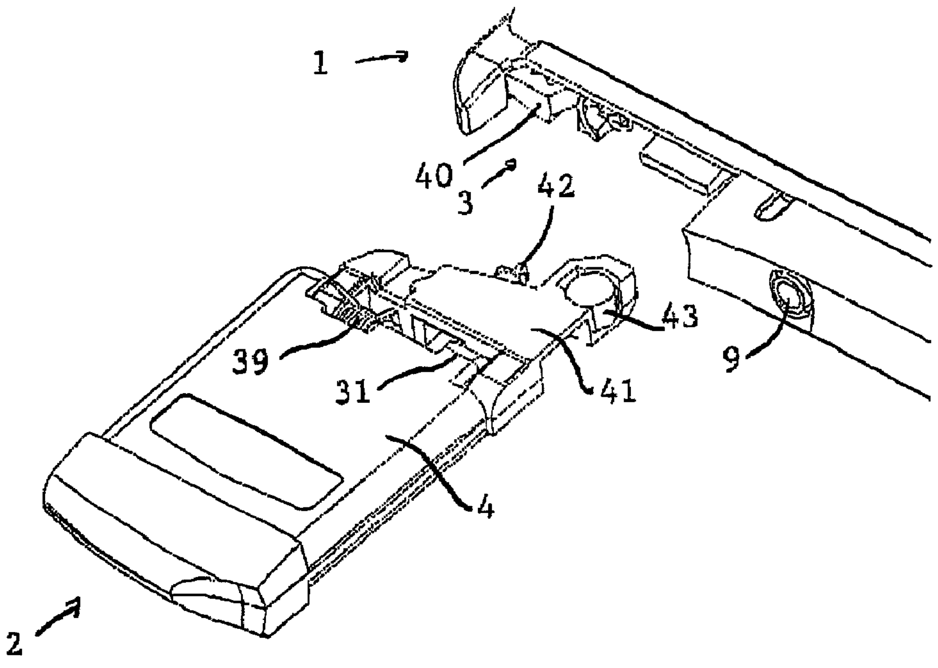
FIGS. 5-8 show details of a fourth and more preferred embodiment of the telecommunications card according to the invention, the card having a removable antenna portion.
Figure 6:
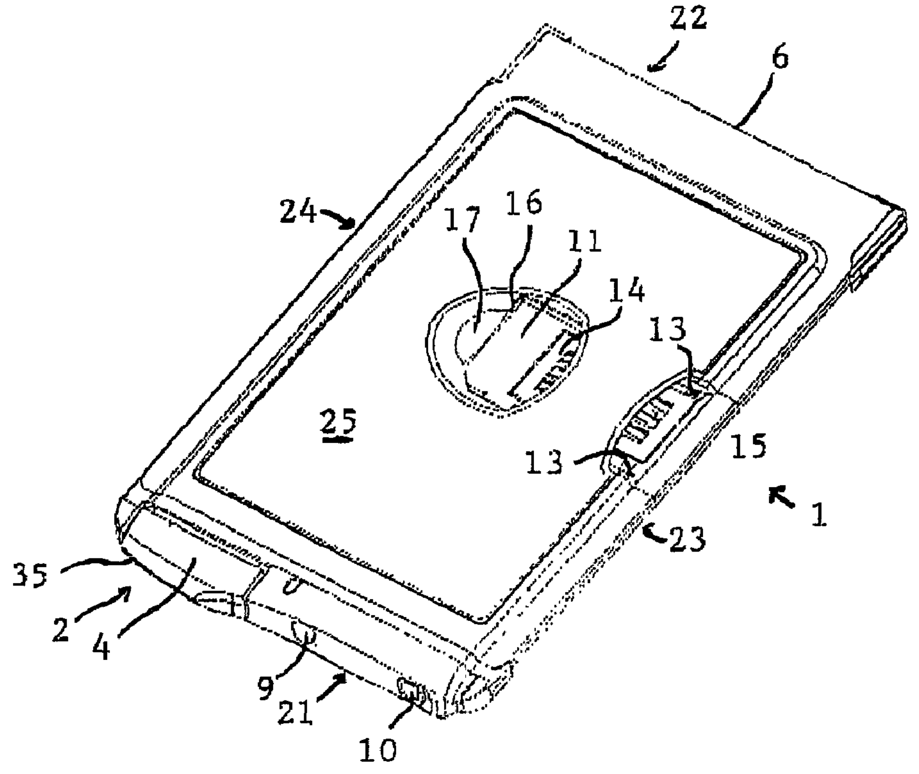
Figure 7:
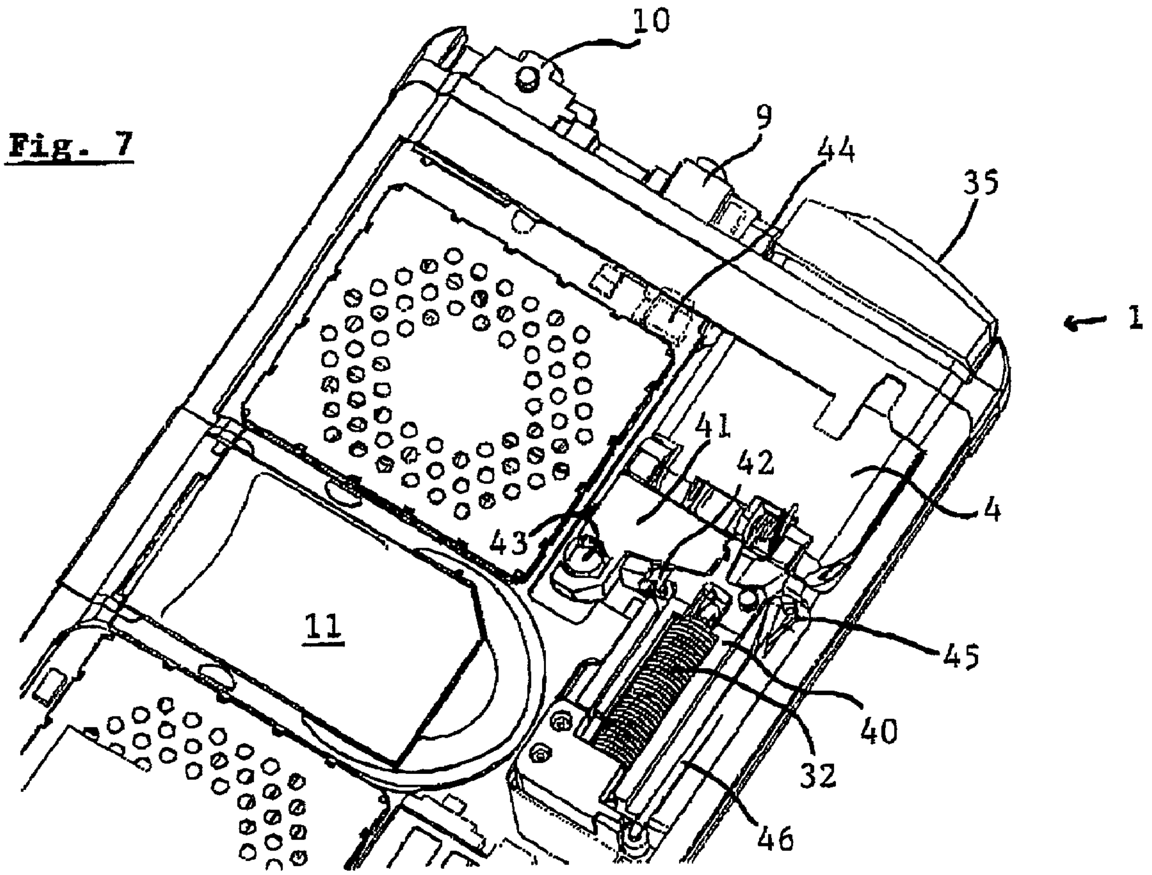
Figure 8:
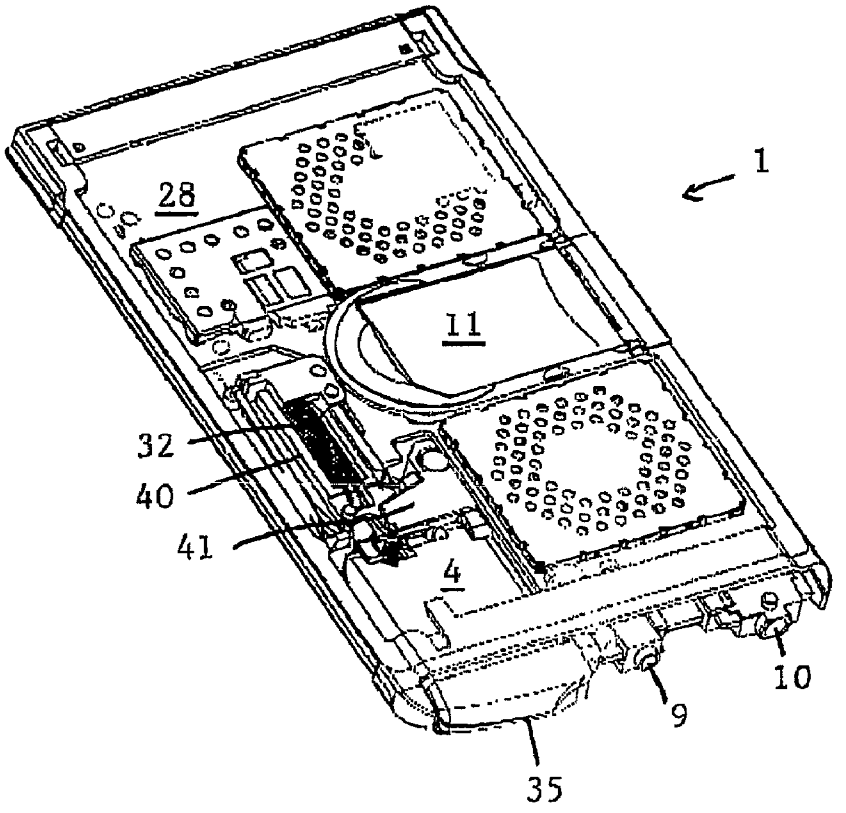

Referring now to FIG. 4, the mounting of the antenna structure 2 in the telecommunications card 1 will be described in more detail. The antenna structure 2 is incorporated in a cavity 3, which is provided in the intermediate layer 26. In the first position, the antenna structure is located within the cavity 3. In the second and third positions, the antenna structure is extended from the cavity 3. The moving means 32, 33 for moving the antenna structure from the first to the second position preferably comprise a spring 32 which is mounted on a bar 33 extending in moving direction of the slide portion 5 of the antenna structure. When the antenna structure 2 is in the first position, the spring is compressed between the slide portion 5 and a back side 36 of the cavity 3. The moving means may however also be constructed in any other way known to the person skilled in the art.

The slide portion 5 and the antenna portion 4 of the antenna structure 2 are movably connected to each other by means of a hinge 31. The erecting means for erecting the antenna portion from the second position to the third position suitable for wireless communication can for example be a torsion spring inside the hinge 31, or any other erecting means known to the person skilled in the art.

The telecommunications card shown in FIG. 4 is preferably further provided with locking means 34, 37 for locking the antenna structure 2 in the first position. This has the advantage that the antenna structure can be locked in the first position while it is not in use. The locking means 34, 37 are preferably constructed such that a user can unlock the antenna structure by pressing an edge 35 of the antenna structure which is accessible from outside the telecommunications card, upon which the antenna structure is moved to the second position, after which the antenna portion is erected to the third position.

In the embodiment shown in FIG. 4, the locking means 34, 37 comprise a connector bar 37 which is movable in a retention track 34. The retention track 34 is provided in a bottom side 38 of the cavity 3 and extends in a plane substantially parallel to the plane of the telecommunications card 1. The connector bar 37 is a hooked element which has one end movable in the retention track 34 and the other end rotatably fixed to the slide portion 5 in such a way that the connector bar 37 can rotate in a direction perpendicular to the moving direction of the slide portion 5. The retention track 34 comprises a longitudinal groove which extends in the moving direction of the slide portion 5 and is divided into a substantially heart-shaped groove near the back side 36 of the cavity. The geometry of the substantially heart-shaped groove is such that, during movement of the antenna structure 2, the end of the connector bar 37 running in the retention track 34 is forced to follow the substantially heart-shaped groove in counterclockwise direction. This is achieved by making the sides of the heart-shaped groove such that each time the end of the connector bar 37 running in the track 34 hits a side wall of the heart-shaped groove, this side wall guides this end in counterclockwise direction. When the antenna structure 2 is in the first position within the cavity 3, this end of the connector bar 37 rests substantially halfway in the heart-shaped groove. In other words, this end of the connector bar 37 runs along the right hand part of the heart-shaped groove when the antenna structure is moved from the second position extended from the cavity to the first position within the cavity, and along the left hand part of the heart-shaped groove when the antenna structure is moved from the first position to the second position. Providing the above described connector bar 37 and retention track 34 has the advantage that the user can unlock the antenna structure 2 from the first position by simply pressing the edge 35 of the antenna portion, and lock the antenna structure 2 in the first position by simply pushing the antenna structure as far as possible into the cavity 3.

Of course, the telecommunications card 1 can also be provided with any other kind of locking means known to the person skilled in the art for locking the antenna structure 2 in the first position within the cavity.

The telecommunications card of FIG. 4 is preferably further provided with switching means (not shown) for alternatively selecting between the antenna 4 and the coaxial connector 9. The switching means may be an electronic switch, for example a transistor switch, or a mechanical switch, or any other switch known to the person skilled in the art. Providing such switching means has the advantage that a selection can be made between wireless communication using the antenna 4 integrated in the card and communication using the coaxial connector 9.

The switching means of the telecommunications card of FIG. 4 is preferably operated by detecting means for detecting whether the antenna portion 2 is in the first position or the third position. These detecting means can for example comprise first and second contact pads 36 which are provided to contact each other when the antenna structure 2 is in the third position and are spaced apart when the antenna structure is in the first position, a current source (not shown) for providing an electrical current to the contact pads 36 and a feedback conductor (not shown) connecting the contact pads to the switching means. When the antenna structure is in the third position, the contact pads 36 conduct the electrical current from the current source to the switching means. Otherwise, when the antenna structure is in the first position, the contact pads 36 form an obstruction for the electrical current. The detecting means can also be any other detecting means known to the person skilled in the art. Providing the detecting means has the advantage that the switching means know which position the antenna structure is in and accordingly select the antenna when it is in the third position and the coaxial connector when the antenna structure is in the first position.

The telecommunications card 1 is operated as follows, When not in use, the antenna structure 2 is in the first position within the cavity 3. If a SIM-card is not yet located in the slot 11 of the telecommunications card 1, the user inserts a SIM-card 12 into the slot 11 in such a way that the contact pads of the SIM-card 12 are in contact with the contact pads of the SIM-card connector 14. Then the user slides the telecommunications card in the slot of the host device 7 in such a way that the interface 6 connects the card 1 to the host device 7. For performing wireless communication with the integrated antenna 2, the user simply presses the accessible edge 35 of the antenna structure 2, so that the locking means 34 are unlocked. As a result, the moving means 32, 33 move the antenna structure 2 from the first to the second position, in which the antenna structure 2 is extended from the cavity. Then the erecting means erect the antenna portion 4 to the third position, in which the plane of the antenna portion 4 forms an angle larger than 30° but smaller than 90°, the optimum angle being about 60°. The detecting means detect that the antenna structure 2 is in the third position, which information is provided to the switching means. Accordingly, the switching means select the antenna 4 for performing wireless communication. Now the card is ready for communicating wirelessly with a telecommunications network, using the integrated antenna 4.

When the user wants to stop the wireless communication, or when the user wants to use the coaxial connector 9 for performing wireless communication, the user simply pushes down the antenna portion 2 until it is in the second position, after which the user pushes the antenna structure 2 into the cavity 3. The antenna structure 2 is locked within the cavity by the locking means 34. The detecting means now detect that the antenna structure 2 is in the first position, which information is provided to the switching means. The switching means accordingly select the coaxial connector 9 for any further wireless communication.

If the user wishes to communicate with an other person in the manner of a conventional wireless telephone, the user simply connects a headset comprising a microphone and a headphone to the audio connector 10. When the host device 7 is a laptop PC, the keyboard of the laptop PC can be used for dialling the telephone number the user wishes to talk to.

Referring to FIGS. 5-8, a more preferred embodiment of the telecommunications card 1 according to the invention will be described. In this embodiment, the antenna portion 4 is removable from the slide portion 5. To this end, the slide portion 5 comprises a chassis 40, which is movably mounted in the cavity 3 of the telecommunications card 1, and an insert 41, on which the antenna portion 2 is movably mounted. The insert 41 is removably mounted on the chassis 40. In this way, the antenna portion 2 can for example be removed from the telecommunications card 1 and replaced when damaged. Furthermore, the removability of the antenna portion 2 can simplify the manufacturing of the telecommunications card 1, as the antenna portion 2 can be inserted into the cavity 3 in a final step. This also enables the customisation of the telecommunications card by providing a set of antennas 2 with different properties which can all be removably mounted in the telecommunications card 1.

The removable mounting of the insert 41 on the chassis is preferably achieved by means of a popper clip 42 on the insert 41, which is provided to release on exertion of a given amount of pull force onto the antenna portion 2. The removable mounting may however also be achieved by any other means known to the person skilled in the art.

Figure 3B:
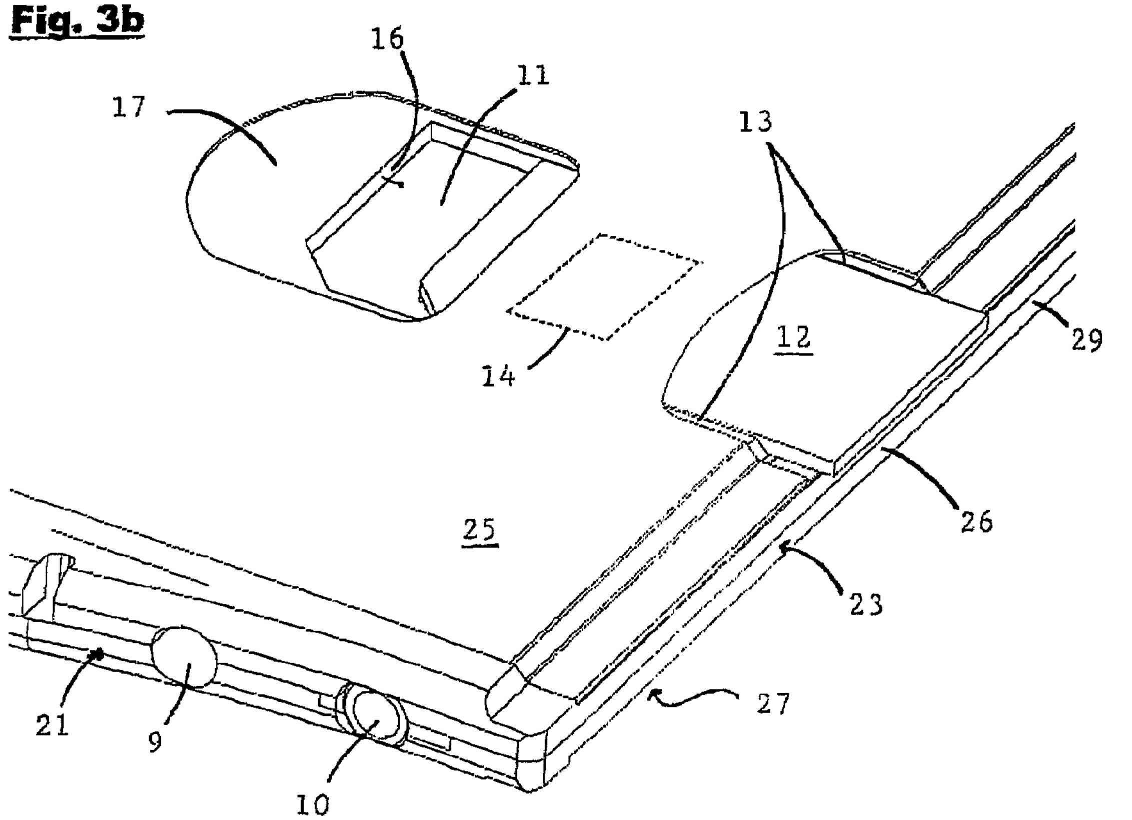

The embodiment of the telecommunications card 1 shown in FIGS. 5-8 differs from the embodiment shown in FIGS. 3-4 in that the switching means (not shown) for selecting between the internal antenna and an external antenna is provided to select the external antenna upon insertion of its coaxial cable into the coaxial connector 9. To this end, the switching means is preferably incorporated in the coaxial connector 9. As a result, no switching means have to be provided in the interior of the telecommunications card, which has the advantages of saving space and limiting the number of assembly steps for manufacturing the card. This also has the advantage that a coaxial connector 9 with incorporated cable detection, which is known in the art, can be used as switching means for selecting between the internal and external antennas.

In this embodiment, the switching means is not operated by detecting means for detecting the position of the antenna portion 2, as the switching means in itself select the coaxial connector 9 upon insertion of a coaxial cable, whether or not the antenna portion 4 is in the third position for wireless communication. The detecting means are however preferably not left out in the telecommunications card of FIGS. 5-8. In this embodiment, they are preferably provided on the telecommunications card for enabling wireless communication via the internal antenna 2 when in the third position and disabling the internal antenna 2 otherwise. It is however clear that the switching means disable the internal antenna 2 even when it is in the third position upon insertion of a coaxial cable into the connector 9.

The detecting means of the embodiment shown in FIGS. 5-8 comprise a magnet 43 on the insert 41 of the slide portion which is provided to cooperate with a hail effect sensor 44 in the interior of the card 1. The magnet 43 and the sensor 44 are mounted such that the magnet 43 is located next to the sensor 44 when the antenna portion 4 is in the third position.

The locking means 45, 46 for locking the antenna structure 2 in the first position within the cavity 3 are switched in the embodiment shown in FIGS. 5-8 with respect to the embodiment of FIG. 4. The hooked member 46 is here mounted on the bottom side of the cavity 3 and the heart-shaped groove is provided in the chassis 40 of the slide portion 5. As the parts are merely switched, it is clear that the operation of the locking means remains substantially the same as described above with reference to FIG. 4.

REFERENCE LIST

1 Telecommunications card
2 Antenna structure
3 Cavity
4 Antenna portion
5 Slide portion
6 Interface
7 Host device
8 Side
9 Coaxial connector
10 Audio connector
11 Slot
12 SIM-card
13 Edge guides
14 SIM-card connector
15 Ramp
16 End stop
17 Second opening
21 Front side
22 Back side
23 Right lateral side
24 Left lateral side
25 Top layer
26 Intermediate layer
27 Bottom layer
28 Printed circuit board
29 Supporting frame
31 Hinge
32 Spring
33 Bar
34 Locking means
35 Edge
36 Back side
37 Connector bar
38 Bottom side
39 Torsion spring
40 Chassis
41 Insert
42 Popper clip
43 Magnet
44 Hall effect sensor
45 Groove
46 Connector bar

The invention claimed is:

1. A telecommunications card for establishing wireless communication between a host device and a telecommunication network, the telecommunications card comprising a cavity, and an antenna structure which is movably mounted in said cavity between a first position in which the antenna structure is substantially located within the cavity and a second position in which the antenna structure is extended from the cavity, and moving means for moving the antenna structure from the first position to the second position, wherein the antenna structure comprises a slide portion by means of which the antenna structure is movably mounted in said cavity, an antenna portion which is movably connected to said slide portion and contains a radiating structure for establishing said wireless communication, and erecting means for automatically erecting the antenna portion with respect to the slide portion to a third position in which the antenna portion forms an angle of between 30 and 90° with respect to an imaginary plane between the first and second positions, the third position of the antenna portion being the optimum angle for establishing and maintaining said wireless communication, wherein the telecommunications card further comprises a connector for connecting the telecommunications card to an external antenna, and wherein the telecommunications card is provided with switching means for selecting between wireless communication using the internal antenna of the card and wireless communication using the external antenna connected to the connector, wherein the switching means is incorporated in the connector.

2. A telecommunications card according to claim 1, wherein, in the third position, the antenna portion forms an angle of preferably approximately 60°, with the slide portion.

3. A telecommunications card according to claim 1, wherein the antenna portion is removably mounted on the slide portion.

4. A telecommunications card according to claim 1, wherein the telecommunications card is provided with detecting means for detecting whether the antenna portion is in the first position or the third position.

5. A telecommunications card according to claim 4, wherein the detecting means comprise a magnet and a hall effect sensor, which are mounted such that the magnet is located adjacent the sensor only when the antenna portion is in the third position.

6. A telecommunications card according to claim 1, wherein the telecommunications card comprises an audio connector for connecting the telecommunications card to audio equipment.

7. A telecommunications card according to claim 1, wherein the telecommunications card has a housing with a top layer, an intermediate layer and a bottom layer, the intermediate layer being provided to include the components of the card.

8. A telecommunications card according to claim 1, wherein the telecommunications card further comprises a slot with a SIM connector for receiving a SIM card.

9. A telecommunications card according to claim 1, wherein the telecommunications card is provided with locking means for locking the antenna structure in the first position, the locking means being constructed such that a user can unlock the antenna structure by pressing an edge of the antenna structure which is accessible from outside the telecommunications card.

10. A telecommunications card for establishing wireless communication between a host device and a telecommunications network, the telecommunications card comprising a cavity, and an antenna structure which is movably mounted in said cavity between a first position in which the antenna structure is substantially located within the cavity and a second position in which the antenna structure is extended from the cavity, and moving means for moving the antenna structure from the first position to the second position, wherein the antenna structure comprises a slide portion by means which the antenna structure is movably mounted in said cavity, an antenna portion which is movably connected to said slide portion and contains a radiating structure for establishing said wireless communication, and erecting means for automatically erecting the antenna portion with respect to the slide portion to a third position in which the antenna portion forms an angle of between 30 and 90° with respect to an imaginary plane between the first and second positions, the third position of the antenna portion being the optimum angle for establishing and maintaining said wireless communication, wherein the telecommunications card is provided with detecting means for detecting whether the antenna portion is in the first position or the third position, wherein said telecommunications card further comprises a switching means operated by the detecting means for detecting whether the antenna portion is in the first position or the third position, and wherein the detecting means comprise a magnet and a hall effect sensor, which are mounted such that the magnet is located adjacent the sensor only when the antenna portion is in the third position.

11. A telecommunications card for establishing wireless communication between a host device and a telecommunication network, the telecommunications card comprising a cavity, and an antenna structure which is movably mounted in said cavity between a first position in which the antenna structure is substantially located within the cavity and a second position in which the antenna structure is extended from the cavity, and moving means for moving the antenna structure from the first position to the second position, wherein the antenna structure comprises a slide portion by means of which the antenna structure is movably mounted in said cavity, an antenna portion which is movably connected to said slide portion and contains a radiating structure for establishing said wireless communication, and erecting means for automatically erecting the antenna portion with respect to the slide potion to a third position in which the antenna portion forms an angle of between 30 and 90° with respect to an imaginary plane between the first and second positions, the third position of the antenna portion being the optimum angle for establishing and maintaining said wireless communication, wherein the telecommunications card further comprises a slot with a SIM connector for receiving a SIM card, and wherein the slot is provided with an opening which is shaped such as to allow a user to remove the SIM card from the slot by means of a finger and to avoid contact between the finger and the SIM connector.

12. A telecommunications card for establishing wireless communication between a host device and a telecommunication network, the telecommunications card comprising:

a cavity;

an antenna structure which is movably mounted in said cavity between a first position in which the antenna structure is substantially located within the cavity and a second position in which the antenna structure is extended from the cavity;

moving means for moving the antenna structure from the first position to the second position;

the antenna structure comprising:

a slide portion by means of which the antenna structure is movably mounted in said cavity;

an antenna portion movably connected to the slide portion and contains a radiating structure for establishing said wireless communication; and erecting means for automatically erecting the antenna portion with respect to the slide portion to a third position of the antenna portion which is the optimum angle for establishing and maintaining said wireless communication with a telecommunications network;

wherein the telecommunications card further comprises switching means for selecting between wireless communication using the antenna structure of the card responsive to a detection that the antenna portion is in the third position and wireless communication using external antenna responsive to a detection that the antenna portion is in the first position, wherein the telecommunications card further comprises a connector for connecting the telecommunications card to an external antenna, and wherein the switching means is incorporated in the connector.

13. A telecommunications card for establishing wireless communication between a host device and a telecommunication network, the telecommunications card comprising:

a cavity;

an antenna structure which is movably mounted in said cavity between a first position in which the antenna structure is substantially located within the cavity and a second position in which the antenna structure is extended from the cavity;

moving means for moving the antenna structure from the first position to the second position;

the antenna structure comprising:

a slide portion by means of which the antenna structure is movably mounted in said cavity;

an antenna portion movably connected to the slide portion and contains a radiating structure for establishing said wireless communication; and erecting means for erecting the antenna portion with respect to the slide portion to a third position which is the optimum angle for establishing and maintaining said wireless communication with a telecommunications network, automatically after the antenna portion is moved from the first position to the second position, wherein the telecommunications card further comprises a connector for connecting the telecommunications card to an external antenna, and wherein the telecommunications card is provided with switching means for selecting between wireless communication using the internal antenna of the card and wireless communication using the external antenna connected to the connector, wherein the switching means is incorporated in the connector.

14. A telecommunications card for establishing wireless communication between a host device and a telecommunication network, the telecommunications card comprising:

a cavity;

an antenna structure which is movably mounted in said cavity between a first position in which the antenna structure is substantially located within the cavity and a second position in which the antenna structure is extended from the cavity;

moving means for moving the antenna structure from the first position to the second position;

the antenna structure comprising:

a slide portion by means of which antenna structure is movably mounted in said cavity;

an antenna portion movably connected to the slide portion and contains a radiating structure for establishing said wireless communication; and erecting means for automatically erecting the antenna portion with respect to the slide portion to a third position of the antenna portion which is the optimum angle for establishing and maintaining said wireless communication with a telecommunications network;

wherein the telecommunications card further comprises switching means for selecting between wireless communication using the antenna structure of the card responsive to a detection that the antenna portion is in the third position wireless communication using external antenna responsive to a detection that the antenna portion is in the first position, wherein the telecommunications card is provided with detecting means for detecting whether the antenna portion is in the first position or the third position, wherein said switching means operated by the detecting means for detecting whether the antenna portion is in the first position or the third position, and wherein the detecting means comprise a magnet and a hall effect sensor, which are mounted such that the magnet is located adjacent the sensor only when the antenna portion is in the third position.

15. A telecommunications card for establishing wireless communication between a host device and a telecommunication network, the telecommunications card comprising:

a cavity;

an antenna structure which is movably mounted in said cavity between a first position in which the antenna structure is substantially located within the cavity and a second position in which the antenna structure is extended from the cavity;

moving means for moving the antenna structure from the first position to the second position;

the antenna structure comprising:

a slide portion by means of which the antenna structure is movably mounted in said cavity;

an antenna portion movably connected to the slide portion and contains a radiating structure for establishing said wireless communication; and erecting means for automatically erecting the antenna portion with respect to the slide portion to a third position of the antenna portion which is the optimum angle for establishing and maintaining said wireless communication with a telecommunications network; and wherein the telecommunications card further comprises a slot with a SIM connector for receiving a SIM card, and wherein the slot is provided with an opening which is shaped such as to allow a user to remove the SIM card from the slot by means of a finger and to avoid contact between the finger and the SIM connector.

16. A telecommunications card for establishing wireless communication between a host device and a telecommunication network, the telecommunications card comprising:

a cavity;

an antenna structure which is movably mounted in said cavity between a first position in which the antenna structure is substantially located within the cavity and a second position in which the antenna structure is extended from the cavity;

moving means for moving the antenna structure from the first position to the second position;

the antenna structure comprising:

a slide portion by means of which the antenna structure is movably mounted in said cavity;

an antenna portion movably connected to the slide portion and contains a radiating structure for establishing said wireless communication; and erecting means for erecting the antenna portion with respect to the slide portion to a third position which is the optimum angle for establishing and maintaining said wireless communication with a telecommunications network, automatically after the antenna portion is moved from the first position to the second position, wherein the telecommunications card is provided with detecting means for detecting whether the antenna portion is in the first position or the third position, wherein said telecommunications card further comprises a switching means operated by the detecting means for detecting whether the antenna portion is in the first position or the third position, and wherein the detecting means comprise a magnet and a hall effect sensor, which are mounted such that the magnet is located adjacent the sensor only when the antenna portion is in the third position.

17. A telecommunications card for establishing wireless communication between a host device and a telecommunication network, the telecommunications card comprising:

a cavity;

an antenna structure which is movably mounted in said cavity between a first position in which the antenna structure is substantially located within the cavity and a second position in which the antenna structure is extended from the cavity;

moving means for moving the antenna structure from the first position to the second position;

the antenna structure comprising:

a slide portion by means of which the antenna structure is movably mounted in said cavity;

an antenna portion movably connected to the slide portion and contains a radiating structure for establishing said wireless communication; and erecting means for erecting the antenna portion with respect to the slide portion to a third position which is the optimum angle for establishing and maintaining said wireless communication with a telecommunications network, automatically after the antenna portion is moved from the first position to the second position, wherein the telecommunications card further comprises a slot with a SIM connector for receiving a SIM card, and wherein the slot is provided with an opening which is shaped such as to allow a user to remove the SIM card from the slot by means of a finger and to avoid contact between the finger and the SIM connector.

* * * * *